(12) United States Patent
Tobe

(10) Patent No.: US 7,676,749 B2
(45) Date of Patent: Mar. 9, 2010

(54) LOGIN MANAGEMENT TECHNIQUE

(75) Inventor: Manabu Tobe, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1038 days.

(21) Appl. No.: 10/899,067

(22) Filed: Jul. 27, 2004

(65) Prior Publication Data

US 2005/0204158 A1    Sep. 15, 2005

(30) Foreign Application Priority Data

Mar. 15, 2004    (JP)    .............. 2004-072016

(51) Int. Cl.
G06F 3/00    (2006.01)
G06F 17/30   (2006.01)

(52) U.S. Cl. .................. 715/741; 726/21; 726/28; 379/265.04

(58) Field of Classification Search .......... 726/21, 726/2, 28, 27; 379/265.04; 707/202; 715/710, 715/741

See application file for complete search history.

(56) References Cited

U.S. PATENT DOCUMENTS

| | | | |
|---|---|---|---|
| 5,845,065 A | 12/1998 | Conte et al. | 395/186 |
| 5,937,159 A | 8/1999 | Meyers et al. | 395/187.01 |
| 6,516,421 B1 * | 2/2003 | Peters | 713/502 |
| 7,020,690 B1 * | 3/2006 | Haitsuka et al. | 709/217 |
| 7,111,157 B1 * | 9/2006 | Hooper | 713/1 |
| 2003/0225472 A1 * | 12/2003 | Kato | 700/117 |
| 2004/0006710 A1 * | 1/2004 | Pollutro et al. | 713/201 |
| 2004/0010440 A1 | 1/2004 | Lenard et al. | |

FOREIGN PATENT DOCUMENTS

| | | |
|---|---|---|
| EP | 0513484 | 11/1992 |
| JP | 10-240687 | 9/1998 |
| JP | 2000-315189 | 11/2000 |
| JP | 2001-229096 | 8/2001 |
| JP | 2001-290641 | 10/2001 |
| JP | 2001-306504 | 11/2001 |
| JP | 2002-222171 | 8/2002 |

OTHER PUBLICATIONS

Patent Abstracts of Japan, vol. 2000, No. 14, Mar. 5, 2001 for Japanese Publication No. 2000 315189.
European Patent Office Communication dated Aug. 23, 2006 for corresponding European Patent Application No. EP 04254544.
European Patent Office Communication, mailed May 2, 2008 and issued in corresponding European Patent Application No. 04 254 544.2-1245.
Japanese Office Action, dated Jul. 8, 2008, issued in the corresponding Japanese Application No. 2004-072016.

* cited by examiner

*Primary Examiner*—Namitha Pillai
(74) *Attorney, Agent, or Firm*—Staas & Halsey LLP

(57) ABSTRACT

The invention is to provide a technique for improving the usage efficiency of user licenses in an environment in which the simultaneous connection number of users is limited. This invention comprises: determining a predetermined allowable time based on a task selected by a user and an attribute of the user; and forcibly making the user log off in a case where it is detected that data relating to the selected task is not inputted or received for a time exceeding the predetermined allowable time. Thus, the time until the logoff is forcibly performed is automatically and suitably set according to, for example, the task conducted by the user or a department to which the user belongs.

9 Claims, 16 Drawing Sheets

| DEPARTMENT 550 | STANDBY TIME AFTER WARNING DISPLAY 552 |
|---|---|
| SALES | 5 |
| PURCHASING | 4 |
| PRODUCING | 5 |
| : | : |

FIG.3

| USER | DEPARTMENT | USER LEVEL | ITEM IN CHARGE |
|---|---|---|---|
| iwa | PURCHASING | NORMAL | IC00001 |
| kagi | SALES | LEADER | MH00157 |
| koba | PRODUCING | SECTION CHIEF | AB11001 |
| tobe | SALES | GENERAL MANAGER | RC00009 |
| yagi | SALES | TEMPORARY | MS10023 |
| : | : | : | : |

FIG.4

| DEPARTMENT | A1 | A2 | A3 | ... | C1 | ... | F1 |
|---|---|---|---|---|---|---|---|
| SALES | 5 | 5 | 5 | ... | 3 | ... | 3 |
| PURCHASING | 3 | 3 | 3 | ... | 5 | ... | 3 |
| PRODUCING | 2 | 2 | 2 | ... | 3 | ... | 1 |
| : | : | : | : | ... | : | ... | : |

| | 700 | 702 | 704 | 706 | 708 | 710 | 712 | 714 | 716 | 718 | 720 | 722 | 724 |
|---|---|---|---|---|---|---|---|---|---|---|---|---|---|
| DEPARTMENT | JAN. | FEB. | MAR. | APR. | MAY | JUN. | JUL. | AUG. | SEP. | OCT. | NOV. | DEC. |
| SALES | | | A | | A | | | A | | | A | |
| PURCHASING | A | | | A | | | A | | | A | | |
| PRODUCING | | A | | | A | | | A | | | A | |
| : | : | : | : | : | : | : | : | : | : | : | : | : |

FIG.7A

| ITEM | JAN. | FEB. | MAR. | APR. | MAY | JUN. | JUL. | AUG. | SEP. | OCT. | NOV. | DEC. |
|---|---|---|---|---|---|---|---|---|---|---|---|---|
| IC00001 | | | A | | A | | | | A | | A |
| MH00157 | | A | | A | | A | | A | | | A |
| AB11001 | A | | | | | | | A | | | | |
| : | : | : | : | : | : | : | : | : | : | : | : | : |

FIG.7B

| USE LEVEL | JAN. | FEB. | MAR. | APR. | MAY | JUN. | JUL. | AUG. | SEP. | OCT. | NOV. | DEC. |
|---|---|---|---|---|---|---|---|---|---|---|---|---|
| TEMPORARY | | | | | | | | | | | | |
| NORMAL | | | | | | | | | | | | |
| LEADER | | A | | | | | | A | | | | |
| SECTION CHIEF | | | A | | | | | | A | | | |
| GENERAL MANAGER | | | A | | | | | | A | | | |
| : | : | : | : | : | : | : | : | : | : | : | : | : |

FIG.7C

| ORDER | JAN. | FEB. | MAR. | APR. | MAY | JUN. | JUL. | AUG. | SEP. | OCT. | NOV. | DEC. |
|---|---|---|---|---|---|---|---|---|---|---|---|---|
| SO-0001 | | | A | | | | | | | | | |
| SO-0211 | | | A | | | | | | | | | |
| PO-2331 | A | | | | | | | | | | | |
| : | : | : | : | : | : | : | : | : | : | : | : | : |

FIG.7D

|  | 800 | 802 | 804 |  | 808 | 810 | 812 |  | 816 | 818 |  | 822 | 824 |
|---|---|---|---|---|---|---|---|---|---|---|---|---|---|
| DEPARTMENT | | 1st DAY | 2nd DAY | ... | 10th DAY | 11th DAY | 12th DAY | ... | 20th DAY | 21th DAY | ... | 30th DAY | 31th DAY |
| SALES | | | | ... | | | | ... | | | ... | A | A |
| PURCHASING | | A | A | ... | A | | | ... | | | ... | | |
| PRODUCING | | | | ... | A | A | A | ... | A | | ... | | |
| : | | : | : | ... | : | : | : | ... | : | : | ... | : | : |

FIG.8A

| ITEM | 1st DAY | 2nd DAY | ... | 10th DAY | 11th DAY | 12th DAY | ... | 20th DAY | 21th DAY | ... | 30th DAY | 31th DAY |
|---|---|---|---|---|---|---|---|---|---|---|---|---|
| RC00009 | A | A | ... | | | | ... | | | ... | | |
| MS10023 | | | ... | | A | | ... | | | ... | | |
| : | : | : | ... | : | : | : | ... | : | : | ... | : | : |

FIG.8B

| USE LEVEL | 1st DAY | 2nd DAY | ... | 10th DAY | 11th DAY | 12th DAY | ... | 20th DAY | 21th DAY | ... | 30th DAY | 31th DAY |
|---|---|---|---|---|---|---|---|---|---|---|---|---|
| TEMPORARY | | | ... | | | | ... | A | A | ... | | |
| NORMAL | | | ... | | | | ... | | | ... | A | A |
| LEADER | A | | ... | | | | ... | | | ... | A | A |
| SECTION CHIEF | A | | ... | | | | ... | | | ... | | |
| GENERAL MANAGER | A | | ... | | | | ... | | | ... | | |
| : | : | : | ... | : | : | : | ... | : | : | ... | : | : |

FIG.8C

| ORDER | 1st DAY | 2nd DAY | ... | 10th DAY | 11th DAY | 12th DAY | ... | 20th DAY | 21th DAY | ... | 30th DAY | 31th DAY |
|---|---|---|---|---|---|---|---|---|---|---|---|---|
| PO-0401 | A | A | ... | | | | ... | | | ... | | |
| WO-1110 | | | ... | | | | ... | A | A | ... | A | A |
| : | : | : | ... | : | : | : | ... | : | : | ... | : | : |

FIG.8D

| 900 | | 902 | 904 | 906 | 908 | 910 | 912 | 914 | 916 | 918 | 920 | 922 |
|---|---|---|---|---|---|---|---|---|---|---|---|---|
| DEPARTMENT | | 8 | 9 | 10 | 11 | 12 | 13 | 14 | 15 | 16 | 17 | 18 |
| SALES | | A | A | | | | | | | A | A | A |
| PURCHASING | | | | A | A | | A | A | | | | |
| PRODUCING | | | | | | | A | | A | | | |
| : | | : | : | : | : | : | : | : | : | : | : | : |

FIG.9A

| ITEM | 8 | 9 | 10 | 11 | 12 | 13 | 14 | 15 | 16 | 17 | 18 |
|---|---|---|---|---|---|---|---|---|---|---|---|
| VT00003 | A | A | | | | | | | A | A | A |
| VS10001 | | | A | A | | A | A | | | | |
| : | : | : | : | : | : | : | : | : | : | : | : |

FIG.9B

| USE LEVEL | 8 | 9 | 10 | 11 | 12 | 13 | 14 | 15 | 16 | 17 | 18 |
|---|---|---|---|---|---|---|---|---|---|---|---|
| TEMPORARY | | | | | | | | | | | |
| NORMAL | | | | | | | | | | | |
| LEADER | A | | | | A | | | | | A | |
| SECTION CHIEF | | A | | | | A | | | | | A |
| GENERAL MANAGER | | | | | | | | | | | |
| : | : | : | : | : | : | : | : | : | : | : | : |

FIG.9C

| ORDER | 8 | 9 | 10 | 11 | 12 | 13 | 14 | 15 | 16 | 17 | 18 |
|---|---|---|---|---|---|---|---|---|---|---|---|
| WO-0123 | A | A | A | A | | | | | | | |
| WO-0224 | | | | | | A | A | A | A | A | A |
| : | : | : | : | : | : | : | : | : | : | : | : |

FIG.9D

| USER ID | tobe |
|---|---|
| LOGIN DATE AND TIME | 2004/2/17 09:20:35 |
| PROCESSING 1 | A1 |
| START TIME OF PROCESSING 1 | 2004/2/17 09:21:50 |
| END TIME OF PROCESSING 1 | 2004/2/17 09:25:25 |
| PROCESSING 2 | A3 |
| START TIME OF PROCESSING 2 | 2004/2/17 09:21:50 |
| END TIME OF PROCESSING 2 | 2004/2/17 09:25:25 |
| PROCESSING 3 | A6 |
| START TIME OF PROCESSING 3 | 2004/2/17 09:25:26 |
| END TIME OF PROCESSING 3 | 2004/2/17 09:30:02 |
| : | |
| LOGOFF TIME | 2004/2/17 10:15:21 |
| | |
| LOGIN DATE AND TIME | 2004/2/17 13:02:05 |
| PROCESSING 1 | A5 |
| START TIME OF PROCESSING 1 | 2004/2/17 13:03:25 |
| END TIME OF PROCESSING 1 | 2004/2/17 13:05:42 |
| PROCESSING 2 | A3 |
| : | |
| LOGOFF TIME | 2004/2/17 14:45:59 |

FIG.10

| DEPARTMENT | START DATE | CYCLE |
|---|---|---|
| SALES | 20031001 | HALF YEAR |
| PURCHASING | 20031001 | HALF YEAR |
| PRODUCING | 20031001 | HALF YEAR |
| : | : | : |

| | 1200 | 1202 | 1204 | 1206 | 1208 | | 1212 | | 1216 | 1218 |
|---|---|---|---|---|---|---|---|---|---|---|
| | USER | DEPARTMENT | A1 | A2 | A3 | ··· | C1 | ··· | F1 | ZZ |
| | iwa | PURCHASING | 5.2 | 5.3 | 5.4 | ··· | 5.1 | ··· | 4.9 | 4.3 |
| | kagi | SALES | 4.9 | 4.5 | 4.2 | ··· | 4.8 | ··· | 4.6 | 4.5 |
| | koba | PRODUCING | 2.4 | 2.8 | 2.5 | ··· | 3.8 | ··· | 4.8 | 2.3 |
| | tobe | SALES | 4.3 | 5.1 | 4.8 | ··· | 4.9 | ··· | 4.5 | 3.3 |
| | yagi | SALES | 3.8 | 4.0 | 4.2 | ··· | 5.5 | ··· | 4.2 | 5.5 |
| | : | : | : | : | : | ··· | : | ··· | : | : |

FIG.12

| 1300 | 1302 | 1304 | 1306 | | 1310 | | 1314 | 1316 |
|---|---|---|---|---|---|---|---|---|
| DEPARTMENT | A1 | A2 | A3 | ··· | C1 | ··· | F1 | ZZ |
| SALES | 4.7 | 4.8 | 4.9 | ··· | 4.5 | ··· | 5.2 | 4.9 |
| PURCHASING | 4.8 | 4.4 | 4.5 | ··· | 4.9 | ··· | 4.3 | 4.6 |
| PRODUCING | 5.2 | 5.5 | 5.3 | ··· | 5.3 | ··· | 4.8 | 4.9 |
| : | : | : | : | ··· | : | ··· | : | : |

FIG.13

LOGIN MANAGEMENT TECHNIQUE

TECHNICAL FIELD OF THE INVENTION

The present invention relates to an information processing technique to effectively use user licenses.

BACKGROUND OF THE INVENTION

In recent years, a growing number of companies have introduced ERP (Enterprise Resource Planning) packages. When the ERP packages are introduced, contracts including regulations of a fee system in which the fee is determined according to the number of simultaneously connected users, are frequently used. In such a case, in a state where an allowed number of connections in the contract are established, a new login request is rejected in an actual operation. That is, as long as any one of users who are logging in does not log off, a new user who desires to log in cannot log in. On the other hand, a user who is logging in does not always perform a task using the ERP package continuously between the login and the logoff. For example, there are many cases where he or she performs different work operations without logging off.

As stated above, even if a user does not need to keep a login state, he or she is counted in the simultaneous connection number unless a logoff is performed, and there occurs a case where a user who desires to log in and to perform the task using the ERP package cannot log in. Accordingly, if the login state is held only in the case where the task using the ERP package is actually performed, the number of simultaneously logging-in users can be decreased, and it also becomes possible to decrease the simultaneous connection number in the contract.

For example, JP-A-2000-315189 discloses a technique to restrict a login time. That is, each of computer terminals monitors whether a no-input time, in which a command for searching a database is not continuously inputted from a user after a connection with a host computer is established, reaches a reference time. The reference time can be set on a reference time setting window displayed on the screen of each computer terminal. When the no-input time reaches the reference time, each computer terminal displays a warning window to inform a user to that effect on the screen. When no command is inputted from the user within a fixed time after the display of the warning window, the terminal sends a forcible logoff command for forcibly disconnecting the connection with the computer terminal to the host computer.

However, in the related art as stated above, it cannot necessarily be said that the user licenses are effectively used in the environment in which the simultaneous connection number of users is limited. This is because, since the time until the forcible logoff can be set by the user, it is conceivable that the user sets the time until the forcible logoff to be longer than an actually required time. That is, according to the related art, even if the user forgets to log off, the logoff is automatically performed, and therefore, an effect can be expected as countermeasures against forgetting logoff. However, it cannot be said that sufficient consideration is given to a viewpoint of increasing a usable time of another user.

SUMMARY OF THE INVENTION

An object of the invention is therefore to provide a technique for improving the usage efficiency of user licenses in an environment in which the simultaneous connection number of users is limited.

A login management method of the invention is a method executed by a computer system in which a login is required by a user and a plurality of kinds of tasks are handled, and comprises: determining a predetermined allowable time based on a task selected by a user and an attribute of the user; and forcibly making the user log off in a case where it is detected that data relating to the selected task is not inputted or received for a time exceeding the predetermined allowable time.

Thus, the time until the logoff is forcibly performed is automatically set according to, for example, the task conducted by the user or a department to which the user belongs. Especially, the ERP package supports various tasks in which login times necessary for transactions are different from each other, and a lot of tasks performed by users belonging to various departments whose working styles are different from each other. Accordingly, according to the invention, the time until the logoff is forcibly performed can be suitably set. Besides, on the basis of the time set in this way, a user judged not to perform any transaction is forcibly made to log off, so that the number of connectable users is increased, and the usage efficiency of the user licenses and the task efficiency can be improved.

In addition, the aforementioned forcibly making the user log off may comprise storing data concerning a screen displayed on a terminal operated by the user into a screen data storage so as to correspond to said user, and the login management method of the invention may further comprise causing the terminal operated by the user to display the screen in response to a re-login by the user who was forcibly made to log off by using the data concerning the screen, which is stored in the screen data storage.

By this processing, the user who was forcibly made to log off is not required to perform the transaction from the first even if he or she was made to log off. In general, in the ERP package, a task is selected from a main menu and a transaction is carried out while a screen transition is repeated. In the case where the logoff is performed after the screen transition has been performed some times, it is a large burden for the user to log in again and start the task from the main menu. Thus, by displaying the screen again, which was displayed on the display device of the terminal immediately before the logoff, the burden of the user is decreased, and the task efficiency can be improved.

Incidentally, a program causing a computer to carry out the aforementioned method is stored in a storage medium or a storage device, for example, a flexible disk, a CD-ROM, a magneto-optical disk, a semiconductor memory, or a hard disk. Besides, there is also a case where the program is distributed as digital signals through a network. Incidentally, intermediate processing data are temporarily stored in a storage device of the computer, such as a main memory.

BRIEF DESCRIPTION OF THE DRAWINGS

FIG. 3 is a diagram showing an example of a table structure of a user management table and data stored;

FIG. 4 is a diagram showing an example of a table structure of an idle time table and data stored;

FIG. 7A is a diagram showing an example of a table structure of a priority month table for respective departments and data stored;

FIG. 7B is a diagram showing an example of a table structure of a priority month table for respective items and data stored;

FIG. 7C is a diagram showing an example of a table structure of a priority month table for respective user levels and data stored;

FIG. 7D is a diagram showing an example of a table structure of a priority month table for respective orders and data stored;

FIG. 8A is a diagram showing an example of a table structure of a priority date table for respective departments and data stored;

FIG. 8B is a diagram showing an example of a table structure of a priority date table for respective items and data stored;

FIG. 8C is a diagram showing an example of a table structure of a priority date table for respective user levels and data stored;

FIG. 8D is a diagram showing an example of a table structure of a priority date table for respective orders and data stored;

FIG. 9A is a diagram showing an example of a table structure of a priority time table for respective departments and data stored;

FIG. 9B is a diagram showing an example of a table structure of a priority time table for respective items and data stored;

FIG. 9C is a diagram showing an example of a table structure of a priority time table for respective user level and data stored;

FIG. 9D is a diagram showing an example of a table structure of a priority time table for respective orders and data stored;

FIG. 10 is a diagram showing an example of log data;

FIG. 11 is a diagram showing an example of a table structure of a summation period table and data stored;

FIG. 12 is a diagram showing an example of a table structure of a first processing time table and data stored;

FIG. 13 is a diagram showing an example of a table structure of a second processing time table and data stored;

DETAILED DESCRIPTION OF THE PREFERRED EMBODIMENTS

Figure 1:
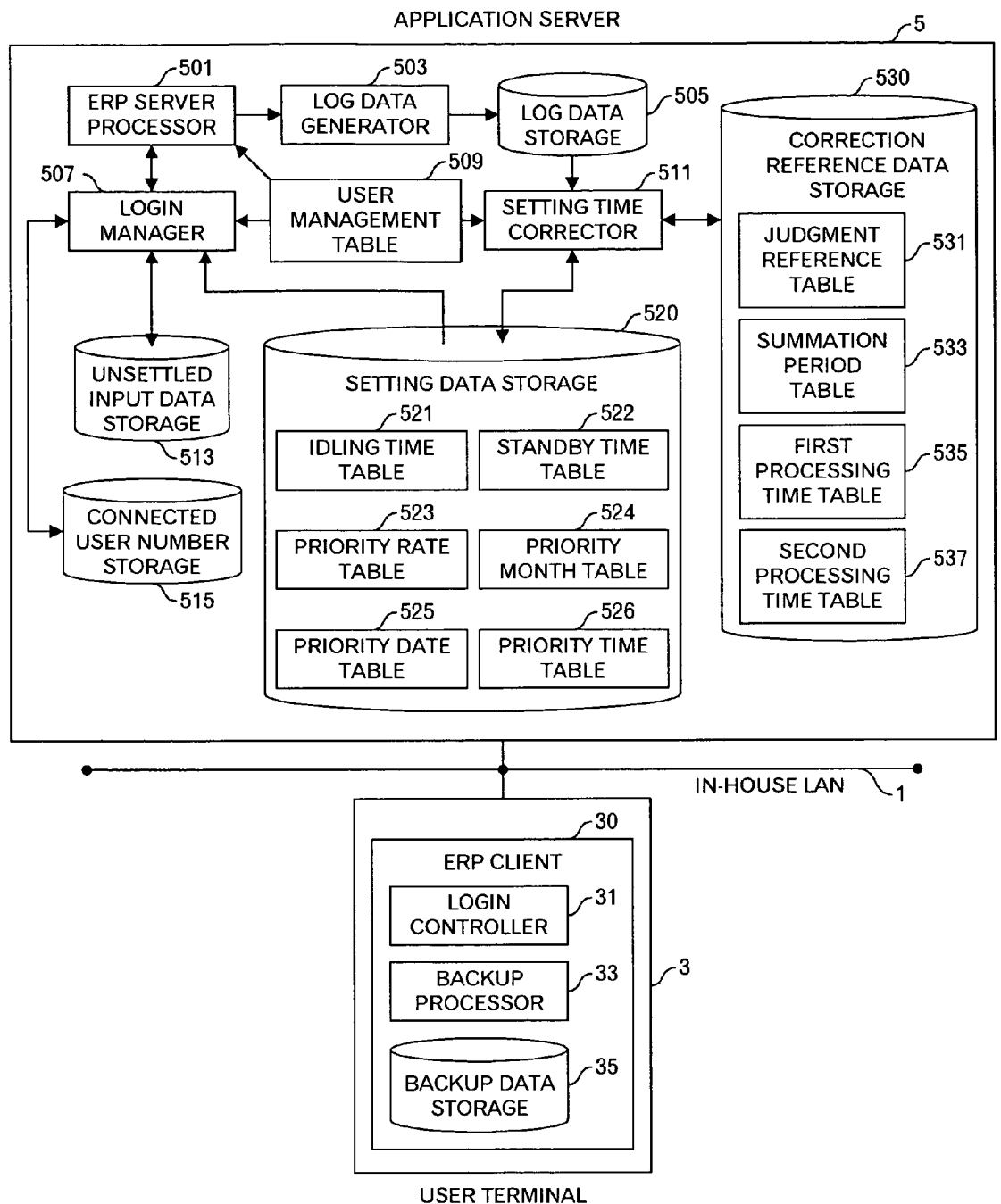
FIG. 1 is a system configuration diagram of an embodiment of the invention.

FIG. 1 is a system configuration diagram of a first embodiment of the invention. For example, an in-house LAN (Local Area Network) 1 as a network in a company is connected with one or plural user terminals 3 as, for example, personal computers, and an application server 5 without wires or with wires. The application server 5 includes an ERP server processor 501, log data generator 503, log data storage 505, login manager 507, user management table 509, setting time corrector 511, unsettled input data storage 513, connected user number storage 515, setting data storage 520, and correction reference data storage 530. The setting data storage 520 includes an idle time table 521, standby time table 522, priority rate table 523, priority month table 524, priority date table 525, and priority time table 526. The correction reference data storage 530 includes a judgment reference table 531, summation period table 533, first processing time table 535, and second processing time table 537. Besides, the user terminal 3 includes an ERP client 30, and the ERP client 30 includes a login controller 31, backup processor 33 and backup data storage 35. The details of processing in the respective processing modules and data stored in the backup data storage 35 will be described later.

The ERP server processor 501 of the application server 5 performs various task processings in response to a request from the user terminal 3 having the ERP client 30. In addition, the ERP server processor 501 refers to the user management table 509 and operates together with the login manager 507 to perform the processing. Further, the ERP server processor 501 instructs the log data generator 503 to carry out the processing in a case where it is necessary to generate log data. The log data generator 503 generates the log data and stores it in the log data storage 505.

The login manager 507 refers to the user management table 509, unsettled input data storage 513, connected user number storage 515, and setting data storage 520, operates together with the ERP server processor 501 to perform processing, and stores data of the processing result into the unsettled input data storage 513 and connected user number storage 515. Incidentally, the data with which a user ID and screen ID are associated is stored in the unsettled input data storage 513, and the number of users under login is stored in the connected user number storage 515. The setting time corrector 511 refers to the log data storage 505, setting data storage 520, and correction reference data storage 530 to perform processing, and stores data of the processing result in the setting data storage 520 and correction reference data storage 530.

Figure 2:
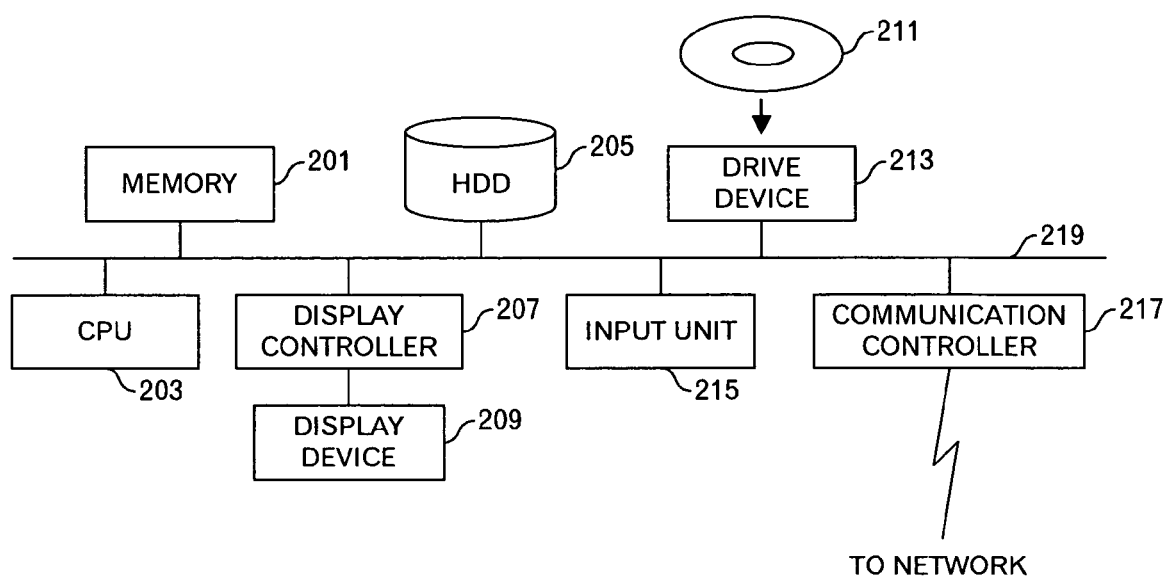
FIG. 2 is a functional block diagram of a computer in the embodiment of the invention.

The user terminal 3 and the application server 5 are computer devices as shown in FIG. 2. A memory 201, CPU 203, hard disk drive (HDD) 205, display controller 207 connected to a display device 209, drive device 213 for a removable disk 211, input device 215, and communication controller 217 for connecting a network are connected through a bus 219. An operating system (OS: Operating System) and application programs including a program for realizing the processing in this embodiment are stored in the HDD 205, and are read from the HDD 205 to the memory 201 when executed by the CPU 203. As the need arises, the CPU 203 controls the display controller 207, communication controller 217, and drive device 213, and causes necessary operations to be performed. Data under processing is stored in the memory 201, and if necessary, is stored in the HDD 205. The program for realizing the processing of the embodiment of the invention is stored in, for example, the removable disk 211, is distributed and is installed into the HDD 205 from the drive device 213, or is received through the network and communication controller 217 and is installed into the HDD 205. The computer device as stated above realizes various functions as described below by systematic cooperation of the hardware such as the CPU 203 and memory 201 and the OS and necessary application programs.

FIG. 3 shows an example of a table structure of the user management table 509 and data stored. The example of FIG. 3 includes a column 300 of user, column 304 of department, column 306 of user level, and column 308 of item in charge. There is also a case where one user is in charge of plural items. On the other hand, according to a department or a user level, there is a user having no item in his or her charge.

FIG. 4 shows an example of a table structure of the idle time table 521 and data stored. The example of FIG. 4 includes a column 400 of department, column 402 of A1, column 404 of A2, column 406 of A3, column 410 of C1, and column 414 of F1. Incidentally, a marks "..." between the column 406 of A3 and the column 410 of C1, and between the column 410 of C1 and the column 414 of F1 indicate that illustration of columns corresponding to task processings is omitted. Idle times corresponding to respective task processings denoted by A1, A2, A3, C1 and F1 are stored in the column 402 of A1, column 404 of A2, column 406 of A3, column 410 of C1, and column 414 of F1. In this embodiment, the idle time is the time in which even if no input is made from a user, countermeasures such as warning are not taken, and in this embodiment, the unit is minute. For example, the numeral of "5" at the first line of the column 402 of A1 indicates that the idle time of 5 minutes is set in the case where the user of the sales department performs the task processing of "A1". In the case where no input is made for 5 minutes or more, a warning message is presented to the user.

Incidentally, in the case where there is a task processing which is not performed in a department to which a user belongs, the idle time is not registered, and the pertinent setting part may be made blank. Besides, also with respect to a combination of a department and task processing to which limitation by the idle time is not desired to be given, there is a case where the idle time is not registered. In this table, initial data is registered by, for example, a system administrator.

Figure 5:
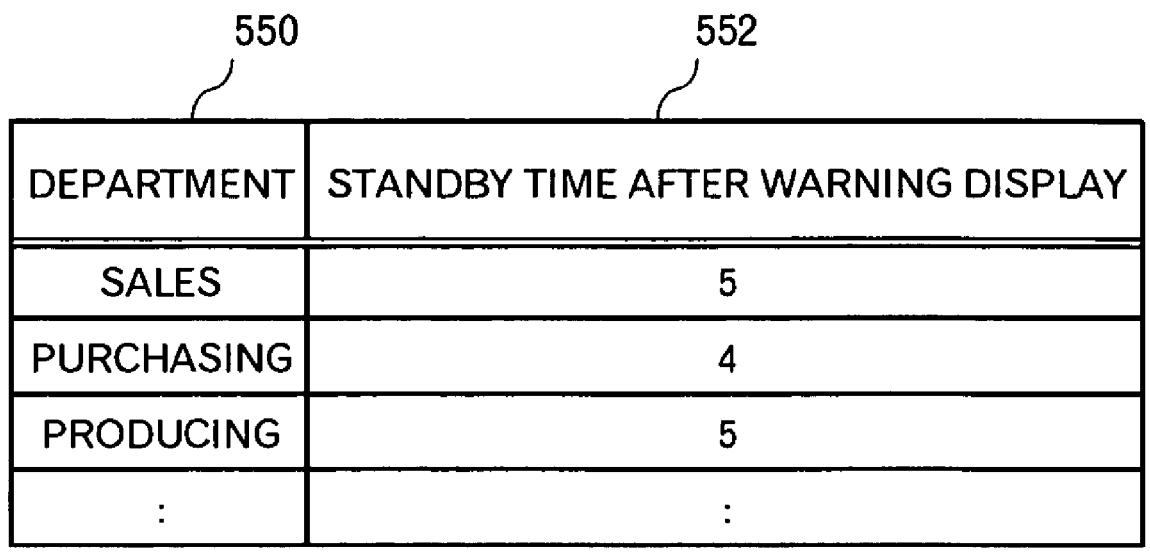
FIG. 5 is a diagram showing an example of a table structure of a standby time table and data stored.

FIG. 5 shows an example of a table structure of the standby time table 522 and data stored. The example of FIG. 5 includes a column 550 of department and column 552 of standby time after warning display. In this embodiment, the standby time after warning display is the time period during which, even if no input is made from the user, countermeasures such as a forcible logoff are not carried out after a warning message is presented to a user. Similarly to the idle time, the unit is minute in this embodiment. For example, the numeral of "5" at the first line in the column 552 of standby time after warning display indicates that in the case where the warning message is presented to the user of the sales department, the standby time is set to 5 minutes. In the case where no input is made for 5 minutes or more, the user is forcibly made to log off. With respect to a department for which setting of forcible logoff is not desired, there is a case where the standby time after warning display is not registered. In this table, initial data is registered by, for example, the system administrator.

Figure 6:
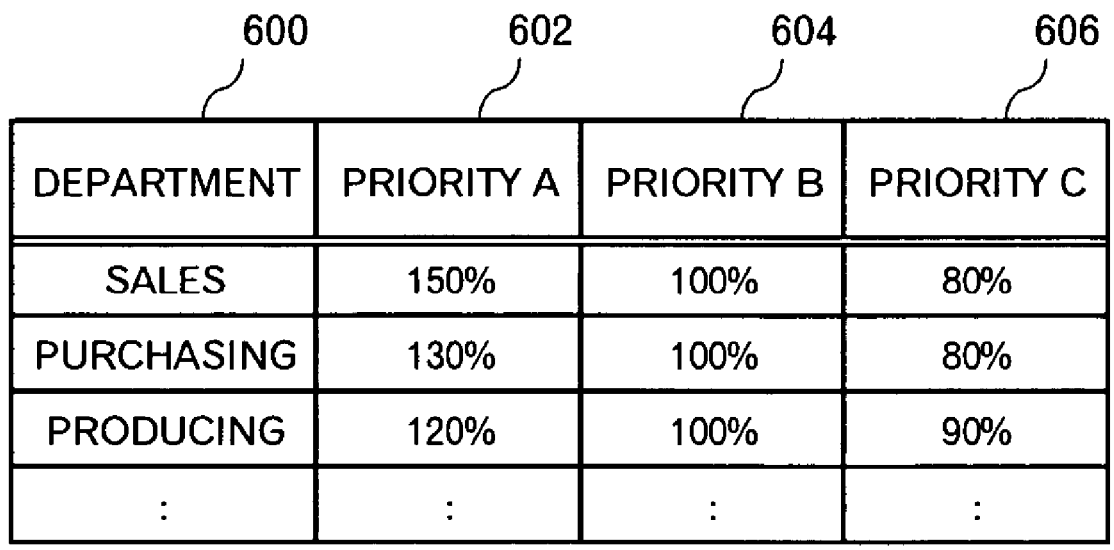
FIG. 6 is a diagram showing an example of a table structure of a priority rate table and data stored.

FIG. 6 shows an example of a table structure of the priority rate table 523 and data stored. The example of FIG. 6 includes a column 600 of department, column 602 of priority A, column 604 of priority B, and column 606 of priority C. In this table, magnifications used when the values registered in the idle time table 521 and standby time table 522 are adjusted, are registered for the respective departments. In this embodiment, because busy periods of tasks and the degree of busyness are different among the departments, the values registered in the idle time table 521 and standby time table 522 are not used as they are. For example, in the busy period, values obtained by multiplying the values registered in the idle time table 521 by the values in the column 602 of priority A, and values obtained by multiplying the values registered in the standby time table 522 by the values in the column 602 of priority A are used. By this table, for the user belonging to the department in which the login date and time is within the busy period, a longer idle time and longer standby time after the warning display than usual can be set.

Although the example of FIG. 6 shows the priority rate table for the respective departments, there is also a case where the priority rates are set for respective items, user levels, and orders in addition to the departments. For example, with respect to an item whose production amount or sales amount is greatly changed according to seasons, it is better to set a longer idle time and longer standby time after the warning display than usual for the user who handles the item. Besides, in the case where a task concentrates on a user holding an administrative position at the end of a month or the end of a term, it is better to set a longer idle time and longer standby time after the warning display than usual for the user holding the administrative position at the end of the month or the end of the term. In the case where there is an order which is desired to be processed with priority at a specific period, it is better to set a longer idle time and longer standby time after the warning display than usual for the user performing the pertinent order in the specific period. That is, the priority rate table 523 includes at least one of a priority rate table for respective departments, priority rate table for respective items, priority rate table for respective user levels, and priority rate table for respective orders.

In the case where plural kinds of priority rate tables are used, any one priority of the plural priorities may be applied, or a new priority such as an average of the plural priorities or a product thereof may be applied. For example, in the case where the priority rate table for respective departments and priority rate table for respective items are used, if the priority of the pertinent department is A, that is, 150%, and the priority of the item is B, that is, 100%, for example, a higher one in priority, that is, 150% may be applied, or for example, an average value, that is, 125% may be applied. Besides, in the case where for example, the priority rate table for respective user levels and priority rate table for respective orders are used, if the priority of the user level is A, that is, 150%, and the priority of the order is also A, that is, 130%, for example, a lower one in priority, that is, 130% may be applied, or for example, a product, that is, 195% (150%×130%) may be applied. In the priority rate table, data is registered by, for example, the system administrator.

FIGS. 7A to 7D show examples of table structures of the priority month table 524 and data stored. FIG. 7A shows a column 700 of department, column 702 of January, column 704 of February, column 706 of March, column 708 of April, column 710 of May, column 712 of June, column 714 of July, column 716 of August, column 718 of September, column 720 of October, column 722 of November, and column 724 of December. A value of "A" indicating priority A is registered at cells having high priority. A blank cell means priority B. There is also a case where a value of "C" indicating priority C is registered at cells having low priority. For example, in the example of FIG. 7A, because "A" is registered at the first line of the column 706 of March, priority A is applied to the user of the sales department on March. In the example shown in FIG. 6, the magnification of the priority A for the sales department is registered as "150%", and values of 150% of normal values are set for the idle time and standby time after the warning display. Although the example of FIG. 4 shows that for example, in the case where the user in the sales department performs the task processing of "A1", the idle time is normally set to 5 minutes, the idle time is adjusted to 7.5 minutes (5 minutes×150%) in the case of March. Similarly, although the example of FIG. 5 shows that the standby time after the warning display is normally set to 5 minutes for the user in the sales department, the standby time is adjusted to 7.5 minutes (5 minutes×150%) in the case of March.

Although FIG. 7A shows the priority month table for respective departments, there is also a case where a priority month tables for respective items, respective user levels, or respective orders is provided. FIGS. 7B to 7D show the examples of the priority month tables for the respective items, respective user levels and respective orders in sequence. The table structures and data stored are similar to FIG. 7A, and the detailed description will be omitted. In the priority month table 524, data is registered by, for example, the system administrator.

FIGS. 8A to 8D show examples of table structures of the priority date table 525 and data stored. FIG. 8A shows a column 800 of department, column 802 of 1st day, column 804 of 2nd day, column 808 of 10th day, column 810 of 11th day, column 812 of 12th day, column 816 of 20th day, column 818 of 21st day, column 822 of 30th day and column 824 of 31st day. Incidentally, a marks " . . . " between the column 804 of 2nd day and the column 808 of 10th day, between the column 812 of 12th day and the column 816 of 20th day, and between the column 818 of 21st day and the column 822 of 30th day indicate that illustration of columns corresponding to dates is omitted.

Similarly to the priority month table for respective departments shown in FIG. 7A, a value of "A" indicating priority A is registered at a cell having high priority. A blank cell corresponds to priority B. There is also a case where a value of "C" indicating priority C is registered at a cell having low priority. For example, in the example of FIG. 8A, because "A" is registered at the second line of the column 802 of 1st day, the priority A is applied to the user of purchasing department on 1st day of every month. In the example shown in FIG. 6, the magnification of the priority A of the purchasing department is registered as "130%", values of 130% of normal values are set for the idle time and standby time after the warning display. Although the example of FIG. 4 shows that in the case where for example, the user of purchasing department performs the task processing of "C1", the idle time is normally set to 5 minutes, the idle time is adjusted to 6.5 minutes (5 minutes×130%) in the case of 1st day of every month. Similarly, although the example of FIG. 5 shows that the standby time after the warning display are normally set to 4 minutes for the user of the purchasing department, the standby time is adjusted to 5.2 minutes (4 minutes×130%) in the case of 1st day of every month.

Although FIG. 8A shows the priority date table for respective departments, there is also a case where a priority date table for respective items, respective user levels or respective orders is provided. FIGS. 8B to 8D show examples of the priority date tables for respective items, respective user levels and respective orders in sequence. The table structures and data stored are similar to FIG. 8A, and the detailed description will be omitted. In the priority date table 525, data is registered by, for example, the system administrator.

FIGS. 9A to 9D show examples of table structures of the priority time table 526 and data stored. FIG. 9A shows a column 900 of department, column 902 of between 8 o'clock and 9 o'clock, column 904 of between 9 o'clock and 10 o'clock, column 906 of between 10 o'clock and 11 o'clock, column 908 of between 11 o'clock and 12 o'clock, column 910 of between 12 o'clock and 13 o'clock, column 912 of between 13 o'clock and 14 o'clock, column 914 of between 14 o'clock and 15 o'clock, column 916 of between 15 o'clock and 16 o'clock, column 918 of between 16 o'clock and 17 o'clock, column 920 of between 17 o'clock and 18 o'clock, and column 922 of between 18 o'clock and 19 o'clock.

Similarly to the priority month table for respective departments shown in FIG. 7A, a value of "A" indicating priority A is registered at a cell having high priority. A blank cell corresponds to priority B. There is a case where a value of "C" indicating priority C is registered at a cell having low priority. For example, in the example of FIG. 9A, because "A" is registered at the third line of the column 912 of between 13 o'clock and 14 o'clock, the priority A is applied to the user of the producing department between 13 o'clock and 14 o'clock. In the example shown in FIG. 6, the magnification of the priority A of the producing department is registered as "120%", and the idle time and standby time after the warning display are set to values of 120% of normal values. Although the example of FIG. 4 shows that for example, in the case where the user of the producing department performs the task processing of "F1", the idle time is normally set to 1 minutes, the idle time is adjusted to 1.2 minutes (1 minute×120%) in the case where a login is performed at the time between 13 o'clock and 14 o'clock. Similarly, although the example of FIG. 5 shows that the standby time after the warning display is normally set to 5 minutes for the user of the producing department, the standby time is adjusted to 6 minutes (5 minutes×120%) in the case where a login is performed at the time between 13 o'clock and 14 o'clock.

Although FIG. 9A shows the priority time table for respective departments, there is also a case where a priority time table for respective items, respective user levels, or respective orders is provided. FIGS. 9B to 9D show examples of the priority time tables for respective items, respective user levels and respective orders in sequence. The table structures and data stored are similar to FIG. 9A, and the detailed description will be omitted. In the priority time table 526, data is registered by, for example, the system administrator.

FIG. 10 shows an example of data stored in the log data storage 505. In the example of FIG. 10, log data of a user named "tobe" is shown. As shown here, the login date and time, start date and time of each processing, end date and time of each processing, and logoff date and time are recorded for each user by the log data generator 503.

FIG. 11 shows an example of a table structure of the summation period table 533 and data stored. The example of FIG. 11 includes a column 1100 of department, column 1102 of start date, and column 1104 of cycle. In this table, the range of log data as an object of summation is registered for each department. For example, at the first line, it is indicated that with respect to the log data of the sales department, the summation is performed for each a half year from Oct. 1, 2003. In the summation period table 533, data is registered by, for example, the system administrator.

FIG. 12 shows an example of a table structure of the first processing time table 535 and data stored. The example of FIG. 12 includes a column 1200 of user, column 1202 of department, column 1204 of A1, column 1206 of A2, column 1208 of A3, column 1212 of C1, column 1216 of F1, and column 1218 of ZZ. Marks " . . . " between the column 1208 of A3 and the column 1212 of C1, and between the column 1212 of C1 and the column 1216 of F1 denote that illustration of columns corresponding to task processings is omitted. Average values of processing times of the respective task processings denoted by A1, A2, A3, C1 and F1 are registered in the column 1204 of A1, column 1206 of A2, column 1208 of A3, column 1212 of C1 and column 1216 of F1 for the respective users. Incidentally, the unit is minute. The processing times of the respective task processings used for the calculation of the average values are specified from the log data stored in the log data storage 505. The summation periods for the respective users are specified from the data stored in the summation period table 533 on the basis of the department to which the user belongs. For example, in the example of FIG. 12, "5.2" is registered at the first line of the column 1204 of A1. This indicates that the user named "iwa" performed the task processing of "A1" and it took 5.2 minutes on average. Because the user named "iwa" is the user belonging to the purchasing department, according to the example of the summation period table 533 shown in FIG. 11, the average value is for, for example, a half year from Oct. 1, 2003.

In the column 1218 of ZZ, average values of the time from the presentation of a warning message till the input are registered for the respective users. Although not shown in the example of FIG. 10, because the time when the warning message is presented and time when the input is made from the user thereafter are also recorded in the log data, the average value can be calculated by referring to the log data storage 505.

Furthermore, although not shown in the example of FIG. 10, for example, in the case where a user starts a task processing and is forcibly made to log off before completion of the task processing, the task processing is interrupted, and therefore, the interruption date and time are recorded in the log data. Then, in the case where the user logged in again, performed the interrupted task processing and completed it, the resuming date and time and the completion date and time are recorded in the log data. In such a case, a value obtained by adding the time from the start date and time of the task processing to the interruption date and time and the time from the resuming date and time to the completion date and time is treated as the processing time taken to perform the task processing. Incidentally, the data registered in this table is generated by the setting time corrector 511.

FIG. 13 shows an example of a table structure of the second processing time table 537 and data stored. The example of FIG. 13 includes a column 1300 of department, column 1302 of A1, column 1304 of A2, column 1306 of A3, column 1310 of C1, column 1314 of F1, and column 1316 of ZZ. Incidentally, a mark " . . . " between the column 1306 of A3 and the column 1310 of C1 and between the column 1310 of C1 and the column 1314 of F1 denote that illustration of columns corresponding to task processings is omitted. In this table, average processing times of the respective departments calculated on the basis of the average processing times of the respective users shown in FIG. 12 are registered. The data stored in this table is generated by the setting time corrector 511.

Figure 14:
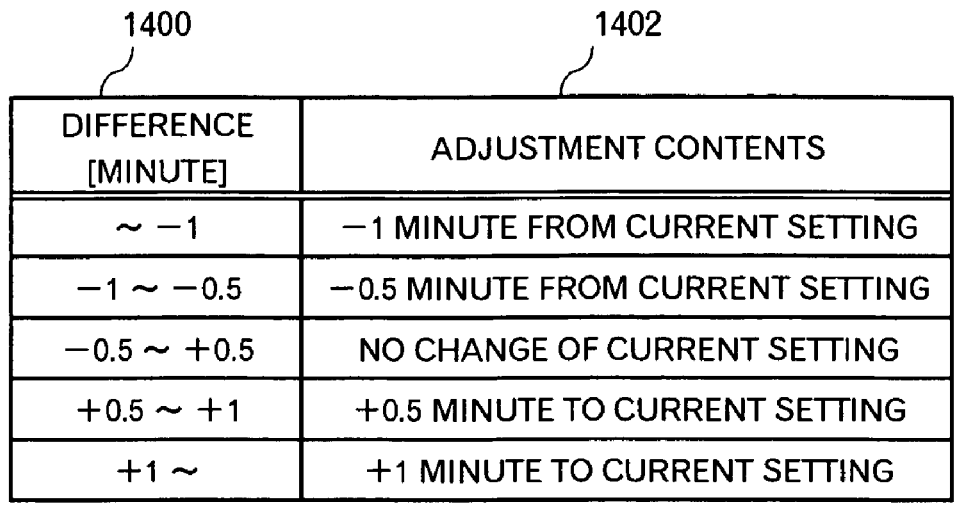
FIG. 14 is a diagram showing an example of a table structure of a judgment reference table and data stored.

FIG. 14 shows an example of a table structure of the judgment reference table 531 and data stored. The example of FIG. 14 includes a column 1400 of difference and column 1402 of adjustment contents. Data for adjustment of the idle time and standby time after the warning display is stored in this table. Specifically, the average value registered in the second processing time table 537 and idle time stored in the idle time table 521 are compared with each other for each department and task processing, and the idle time is updated in accordance with the difference and in accordance with the contents set in this table. For example, in the case where the average processing time of the task processing of "A1" by the user of the sales department is registered as "4.7 (minutes)" in the second processing time table 537, and on the other hand, the idle time of the task processing of "A1" by the user of the sales department is registered as "5 (minutes)" in the idle time table 521, the difference is calculated as −0.3 (4.7-5.0). In accordance with the example shown in FIG. 14, because the difference corresponds to the difference of from −0.5 to +0.5, the idle time is not updated.

Similarly, the average value (value of the column 1316 of ZZ) registered in the second processing time table 537 and standby time after the warning display stored in the standby time table 522 are compared with each other for each department, and the standby time after the warning display is updated in accordance with the difference and in accordance with the contents set in the table.

Figure 15:
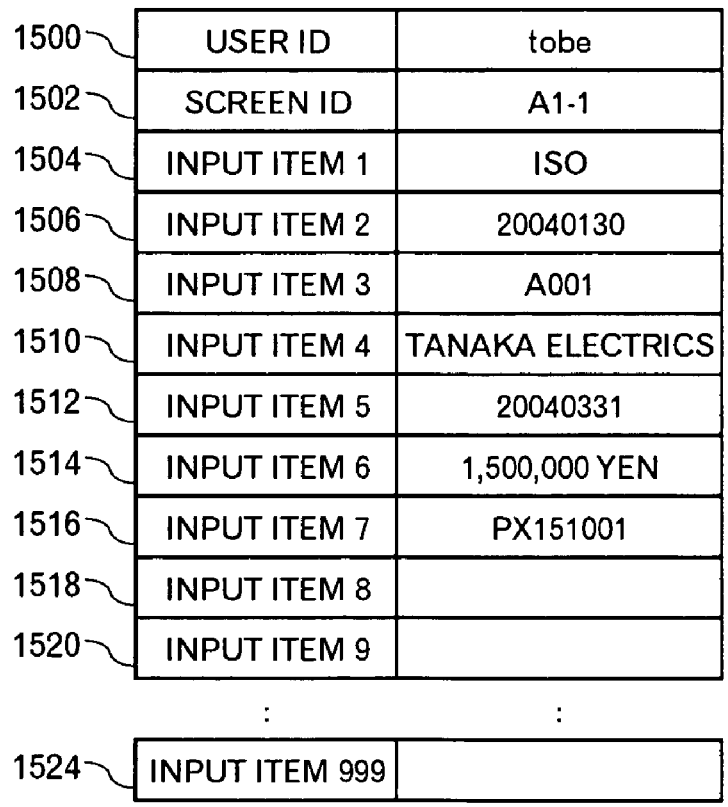
FIG. 15 is a diagram showing an example of a table structure of a backup data storage and data stored.

FIG. 15 shows an example of a table structure of the backup data storage 35 of the user terminal 3 and data stored. The example of FIG. 15 includes a row 1500 of user ID, row 1502 of screen ID, row 1504 of input item 1, row 1506 of input item 2, row 1508 of input item 3, row 1510 of input item 4, row 1512 of input item 5, row 1514 of input item 6, row 1516 of input item 7, row 1518 of input item 8, row 1520 of input item 9, and row 1524 of input item 999. A mark ":" between the row 1520 of input item 9 and the row 1524 of input item 999 denotes that illustration of rows corresponding to input items 10 to 998 is omitted. FIG. 15 shows the example of data stored in the backup data storage 35 in the case where for example, the user named "tobe" performs the input to the respective items of the screen shown by the screen ID "A1-1", and a forcible logoff is made at the time point when the inputting of the input items 1 to 7 has been ended. Such data is displayed on the screen in response to the re-login of the user named "tobe", so that the user has not to perform the input processing from the first. Incidentally, such data is generated by the backup processor 33 and is stored in the backup data storage 35.

Figure 16:
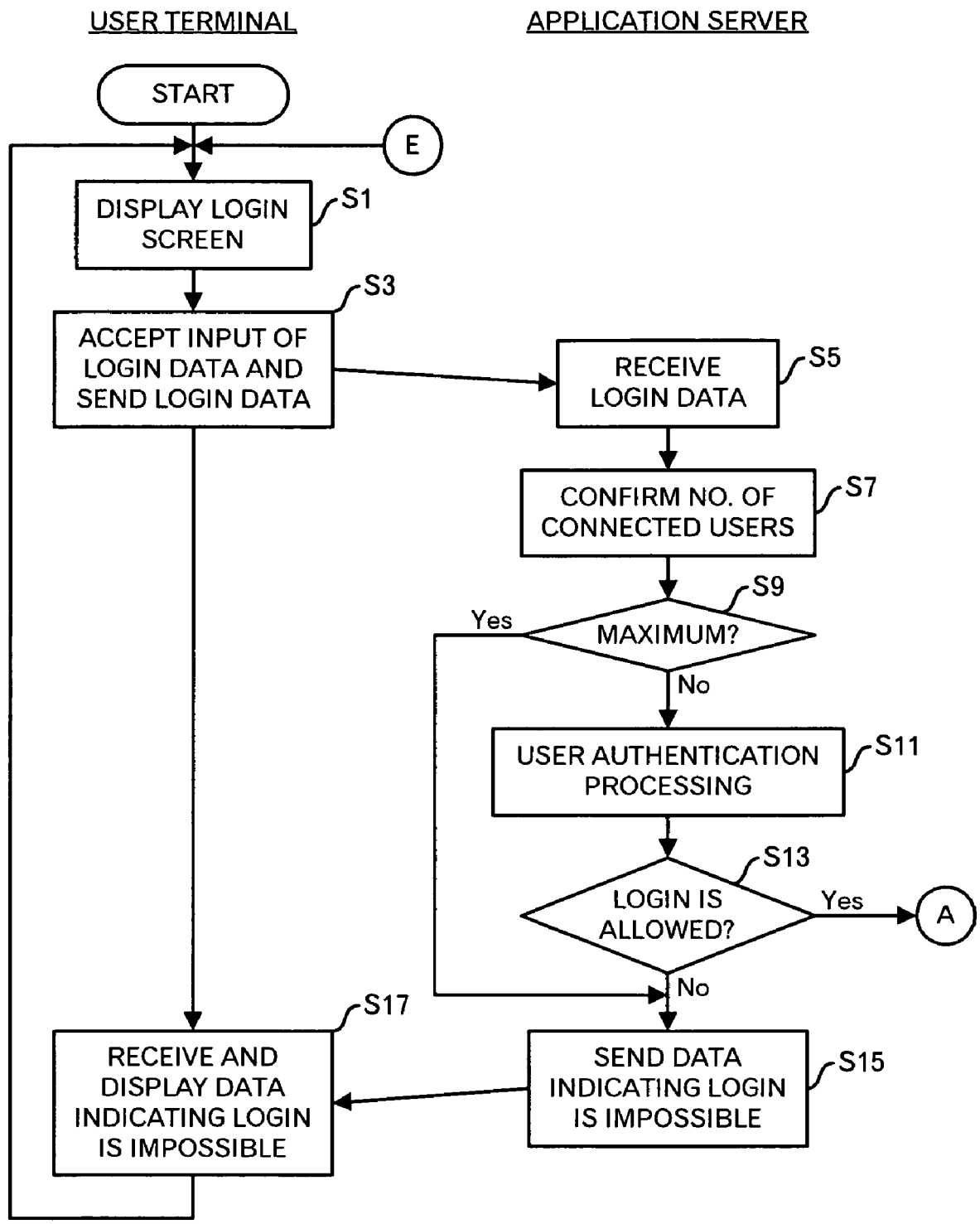
FIG. 16 is a first diagram showing a main processing flow of the embodiment of the invention.

The processing of the system shown in FIG. 1 will be described with reference to FIGS. 16 to 21. First, the ERP client 30 of the user terminal 3 displays a login screen on a display device in accordance with the operation of the user (FIG. 16: step S1). Then, the ERP client 30 accepts an input of login data from the user, and transmits the login data to the application server 5 (step S3). The login manager 507 of the application server 5 receives the login data from the user terminal 3, and temporarily stores it in a storage device such as a work memory area (not shown) or the like (step S5). In addition, the login manager 507 refers to the connected user number storage 515 and confirms the number of connected users (step S7). Then, the login manager 507 judges whether the number of connected users is maximum (step S9). In the case where it is judged to be maximum (step S9: Yes route), the processing shifts to the processing of step S15 described later. On the other hand, in the case where it is judged not to be maximum (step S9: No route), the login manager 507 refers to the user management table 509 and performs a user authentication processing (step S11). Besides, the login manager 507 judges whether the login of the user is allowed on the basis of the result of the user authentication processing (step S13). In the case where it is judged that the login is allowed (step S13: Yes route), the processing shifts to the processing of FIG. 17 through terminal A. On the other hand, in the case where it is judged that the login is not allowed (step S13: No route), the login manager 507 transmits data indicating that the login is impossible to the user terminal 3 (step S15). The ERP client 30 of the user terminal 3 receives the data indicating that the login is impossible from the application server 5, and displays a message indicating that the login could not be made on the display device (step S17). Then, the processing returns to the processing of the step S1. As stated above, in addition to the case where the user is not authenticated, also in the case where the number of connected users is maximum, the user cannot perform a login.

Figure 17:
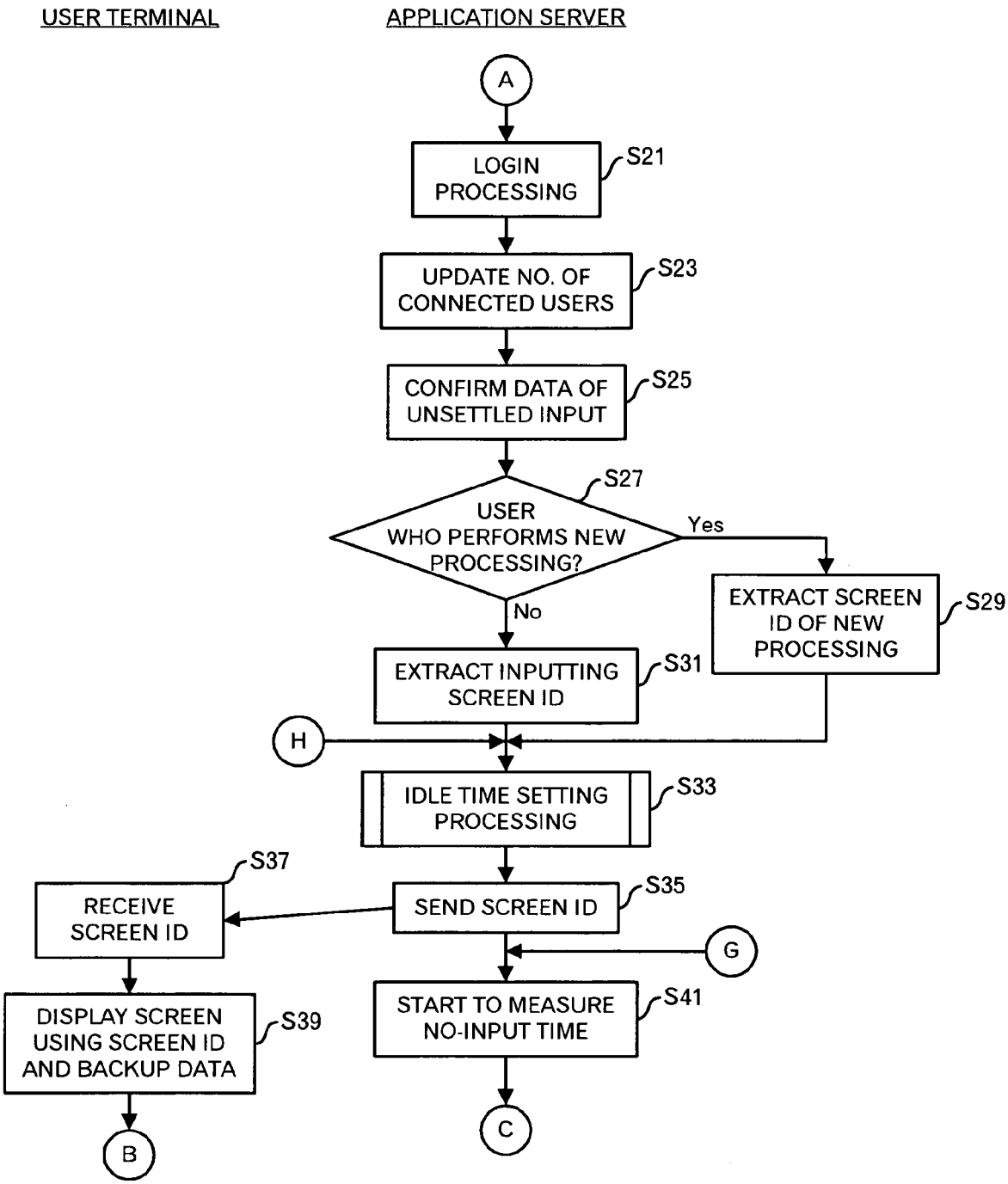
FIG. 17 is a second diagram showing the main processing flow of the embodiment of the invention.

FIG. 17 shows processings after the transition through the terminal A. First, the login manager 507 of the application server 5 performs the login processing (FIG. 17: step S21). Besides, the login manager 507 updates the number of connected users stored in the connected user number storage 515 (step S23). That is, the number is incremented by 1. Next, the login manager 507 confirms whether the data for the user is stored in the unsettled input data storage 513 on the basis of the user ID of the login user (step S25). Then, the login manager 507 judges whether the login user is a user who performs a new processing on the basis of the processing result of the step S25 (step S27). Unless the data for the user is stored in the unsettled input data storage 513, the user is a user who performs the new processing.

In the case where it is judged that the user is a user who performs the new processing (step S27: Yes route), the login manager 507 extracts, for example, a screen ID for the new processing of a menu screen, or the like (step S29). For example, the ID is extracted from the setting data contained in the ERP server processor 501. Then, the processing shifts to the processing of step S33 described later. On the other hand, in the case where it is judged that the user is not a user who performs the new processing (step S27: No route), the login manager 507 extracts an inputting screen ID from the data for the user stored in the unsettled input data storage 513 (step S31). The inputting screen ID is the ID of the screen displayed on the display device of the user terminal 3 when the logoff is forcibly carried out. Next, the login manager 507 performs an idle time setting processing (step S33). Although the details of the idle time setting processing will be described later, as a result of the processing, the idle time for this login and standby time after the warning display are determined.

Then, the login manager 507 transmits the extracted screen ID to the user terminal 3 (step S35). The ERP client 30 of the user terminal 3 receives the screen ID from the application server 5 (step S37). Besides, the ERP client 30 displays the screen on the display device using the received screen ID and the data stored in the backup data storage 35 (step S39). Specifically, first, the screen corresponding to the received screen ID is specified. Further, the input item data corresponding to the received screen ID is extracted from the backup data storage 35. Then, data of the screen in which the input item data is embedded into corresponding input columns or the like, is generated and is displayed on the display device. Incidentally, in the case where the screen ID of the new processing screen is received, because corresponding input item data is not stored in the backup data storage 35, the screen in which input item data is not embedded is displayed as it is. In the case where the input screen ID is received, the screen display is carried out using the data stored in the backup data storage 35, so that the user can perform the task processing from the last processing.

On the other hand, after transmitting the screen ID at the step S35, the login manager 507 of the application server 5 starts to measure a no-input time (step S41). The no-input time is the time in which no input is made from the user. Then, the processing shifts to the processing of FIG. 18 through terminals B and C.

Figure 18:
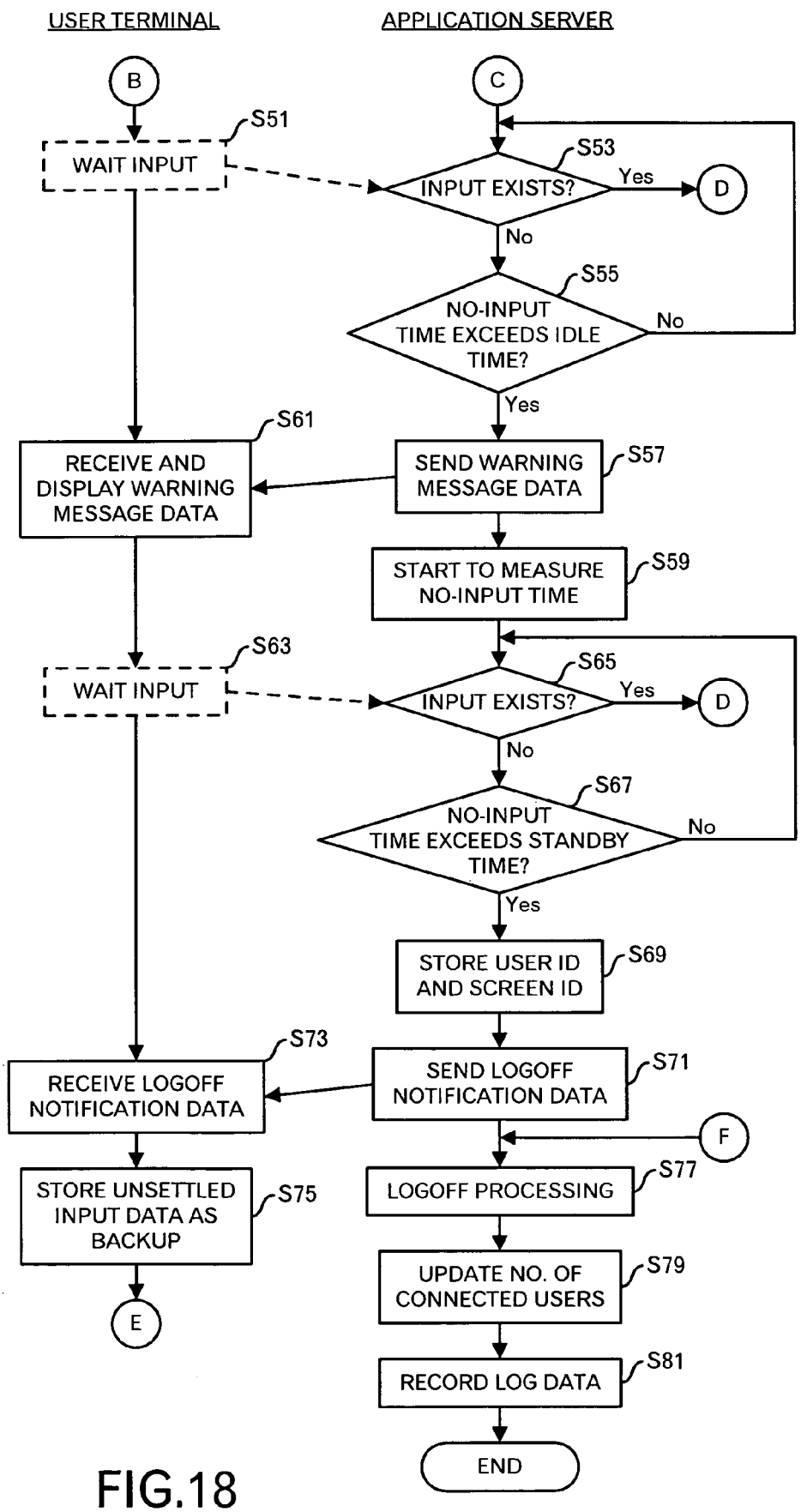
FIG. 18 is a third diagram showing the main processing flow of the embodiment of the invention.

FIG. 18 shows a processing after the transition through the terminals B and C. First, the ERP client 30 of the user terminal 3 is in a state of waiting an input from the user, and when there is an input from the user, the ERP client notifies the application server of an input event (FIG. 18: step S51). Incidentally, in the case where a predetermined input event, for example, a click of a "register" button occurs, actual input data is contained in the notification data. The login manager 507 of the application server 5 judges whether there is an input from the user (step S53). In the case where it is judged that there is an input (step S53: Yes route), the processing shifts to the processing of FIG. 19 through terminal D. On the other hand, in the case where it is judged that there is no input (step S53: No route), the login manager 507 judges whether the no-input time whose measurement was started at step S41 (FIG. 17) exceeds the idle time determined at the step S33 (FIG. 17) (step S55). In the case where it is judged that the idle time does not exceed (step S55: No route), the processing returns to the step S53. On the other hand, in the case where it is judged that the no-input time exceeds the idle time (step S55: Yes route), the login manager 507 transmits warning message data to the user terminal 3 (step S57). Incidentally, the warning message data may be generated at the step S57, or previously prepared warning message data may be transmitted. In addition, in the case where the warning message data is held in the user terminal 3, instruction data to cause the warning message to be displayed is transmitted to the user terminal 3. Moreover, the login manager 507 again starts to measure the no-input time (step S59).

On the other hand, when receiving the warning message data from the application server 5, the login controller 31 included in the ERP client 30 of the user terminal 3 displays it on the display device (step S61). Then, the ERP client 30 of the user terminal 3 is again put into a state of waiting an input from the user, and when there is an input from the user, the ERP client notifies the application server of the input event (step S63). Incidentally, in the case where a predetermined input event, for example, a click of the "register" button occurs, actual input data is contained in the notification data. The login manager 507 of the application server 5 judges whether there is an input from the user (step S65). In the case where it is judged that there is an input (step S65: Yes route), the processing shifts to the processing of FIG. 19 through terminal D. On the other hand, in the case where it is judged that there is no input (step S65: No route), the login manager 507 judges whether the no-input time whose measurement was started at the step S59 exceeds the standby time after the warning display determined at the step S33 (FIG. 17) (step S67). In the case where it is judged that the no-input time does not exceed (step S67: No route), the processing returns to the step S65. On the other hand, in the case where it is judged that the no-input time exceeds the standby time after the warning display (step S67: Yes route), the login manager 507 associates the user ID of the user, who has not made an input for a time exceeding the standby time after the warning display, with the screen ID of the screen displayed on the display device of the user terminal 3 and stores them in the unsettled input data storage 513 (step S69). Incidentally, the user ID and screen ID are acquired by inquiring the ERP server processor 501, and the screen ID is stored as the inputting screen ID into the unsettled input data storage 513.

In addition, the login manager 507 transmits logoff notification data to the user terminal 3 (step S71). Incidentally, the logoff notification data may be generated at the step S71, or previously prepared logoff notification data may be transmitted. The login controller 31 included in the ERP client 30 of the user terminal 3 receives the logoff notification data from the application server 5 (step S73). When detecting that the login controller 31 receives the logoff notification data, the backup processor 33 included in the ERP client 30 of the user terminal 3 stores unsettled input data in the backup data storage 35 (step S75). For example, the data as shown in FIG. 15 is stored. Then, the processing returns to the step S1 (FIG. 16) through terminal E.

On the other hand, the login manager 507 of the application server 5 transmits logoff notification data at the step S71, and then performs a logoff processing (step S77). The login manager 507 updates the number of connected users stored in the connected user number storage 515 (step S79). That is, the number is decremented by 1. In addition, the ERP server processor 501 operating together with the login manager 507 notifies the log data generator 503 that the user has been made to log off, and the log data generator 503 records the log data relating to the logoff into the log data storage 505 (step S81). Then, the processing is ended.

Figure 19:
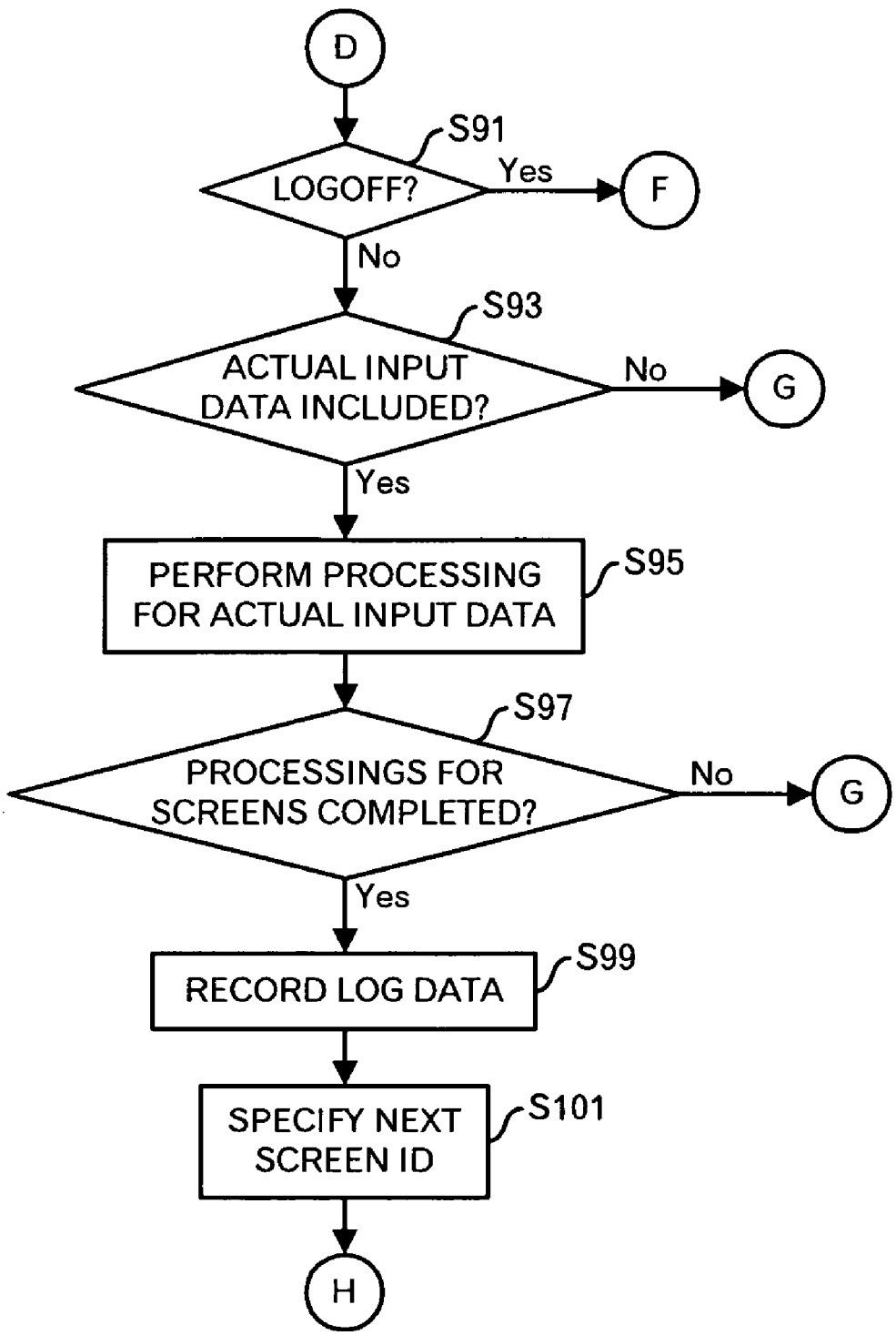
FIG. 19 is a fourth diagram showing the main processing flow of the embodiment of the invention.

FIG. 19 shows a processing after the transition through the terminal D. First, the ERP server processor 501 of the application server 5 judges whether the input from the user indicates logoff (FIG. 19: step S91). In the case where it is judged that the input indicates the logoff (step S91: Yes route), the processing shifts to the step S77 (FIG. 18) through terminal F. On the other hand, in the case where it is judged that the input does not indicate the logoff (step S91: No route), the ERP server processor 501 judges whether actual input data is contained in the notification data transmitted from the user terminal 3 (step S93). In the case where it is judged that the actual input data is not contained in the notification data (step S93: No route), the processing returns to the step S41 through terminal G (FIG. 17). On the other hand, in the case where it is judged that the actual input data is contained in the notification data (step S93: Yes route), the ERP server processor 501 performs a processing corresponding to the actual input data (step S95). There is also a case where the processing result is transmitted to the user terminal 3. The ERP server processor 501 judges whether a series of processings relating to the screens displayed on the display screen of the user terminal 3 are completed (step S97). In the case where it is judged that the processings for the screens are not completed (step S97: No route), the processing returns to the step S41 (FIG. 17) through the terminal G. On the other hand, in the case where it is judged that the processings for the screens are completed (step S97: Yes route), the log data generator 503 records the log data relating to the processing of the screen into the log data storage 505 (step S99). The ERP server processor 501 specifies an ID of a next screen displayed on the display screen of the user terminal 3 (step S101). Then, the processing shifts to the step S33 (FIG. 17) through terminal H.

In this way, the usage efficiency of the user licenses can be improved by forcibly making the user who does not make an input for a time exceeding the standby time after the warning display log off. Besides, the burden of the user is reduced and the task efficiency can be improved by again displaying the screen displayed on the display device of the terminal just before the logoff.

Incidentally, according to some ERP packages, because a Web technology is used, it is not necessary to install a dedicated client program in a user terminal. In such a case, for example, even if a user inputs only one character, notification is not given to a server side. Accordingly, input or selection data is transmitted from the user terminal by, for example, clicking a "register" button, and in the case where such input or selection data is received at the server side, it is judged that there is an input from the user. On the other hand, in the case where a state in which input or selection data is not received continues for a time exceeding an idle time or a standby time after the warning display, it is judged that the input from the user has not been made.

In the case where a warning message is presented to a user, or a login screen is made to be displayed on the user terminal after the user is forcibly made to log off, it is not possible to one-sidedly transmit data to the user terminal from the server side without receiving a request from the user terminal. Therefore, for example, a tag for periodically refreshing a screen is embedded in Web page data. Besides, it is difficult to store data, which has not been transmitted to the server side at the time point of logoff, in the storage device of the user terminal. Therefore, a screen ID (not including data under input) of a screen displayed on the display device of the terminal just before the logoff is associated with a user ID, and they are held at the server side (or held as a cookie at the user terminal side), and the screen just before the logoff is made to be displayed in response to re-login. By doing so, the technique of the invention can be applied also to the ERP package using the Web technique.

Figure 20:
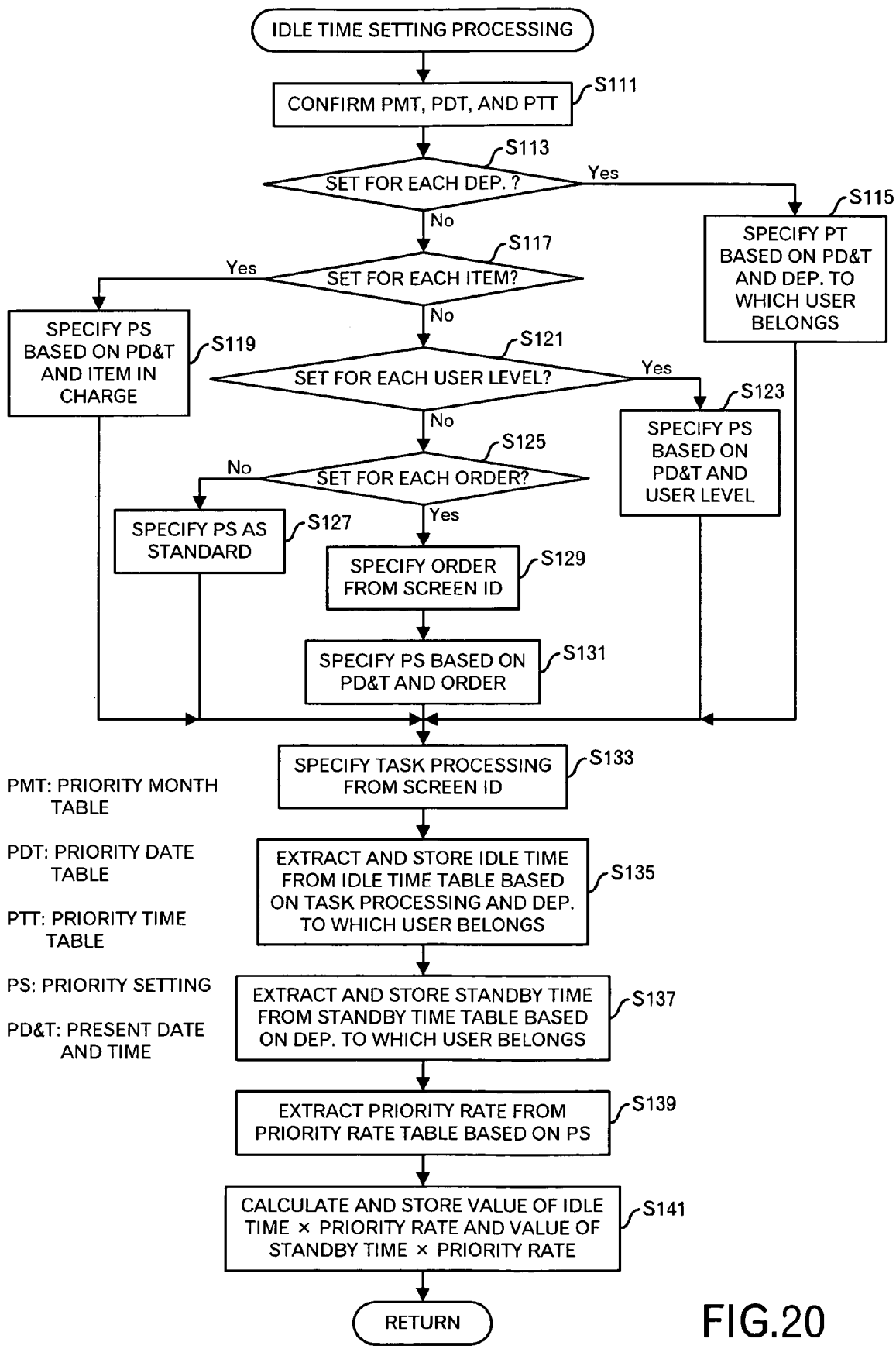
FIG. 20 is a diagram showing a processing flow of an idle time setting processing.
Figure 21:
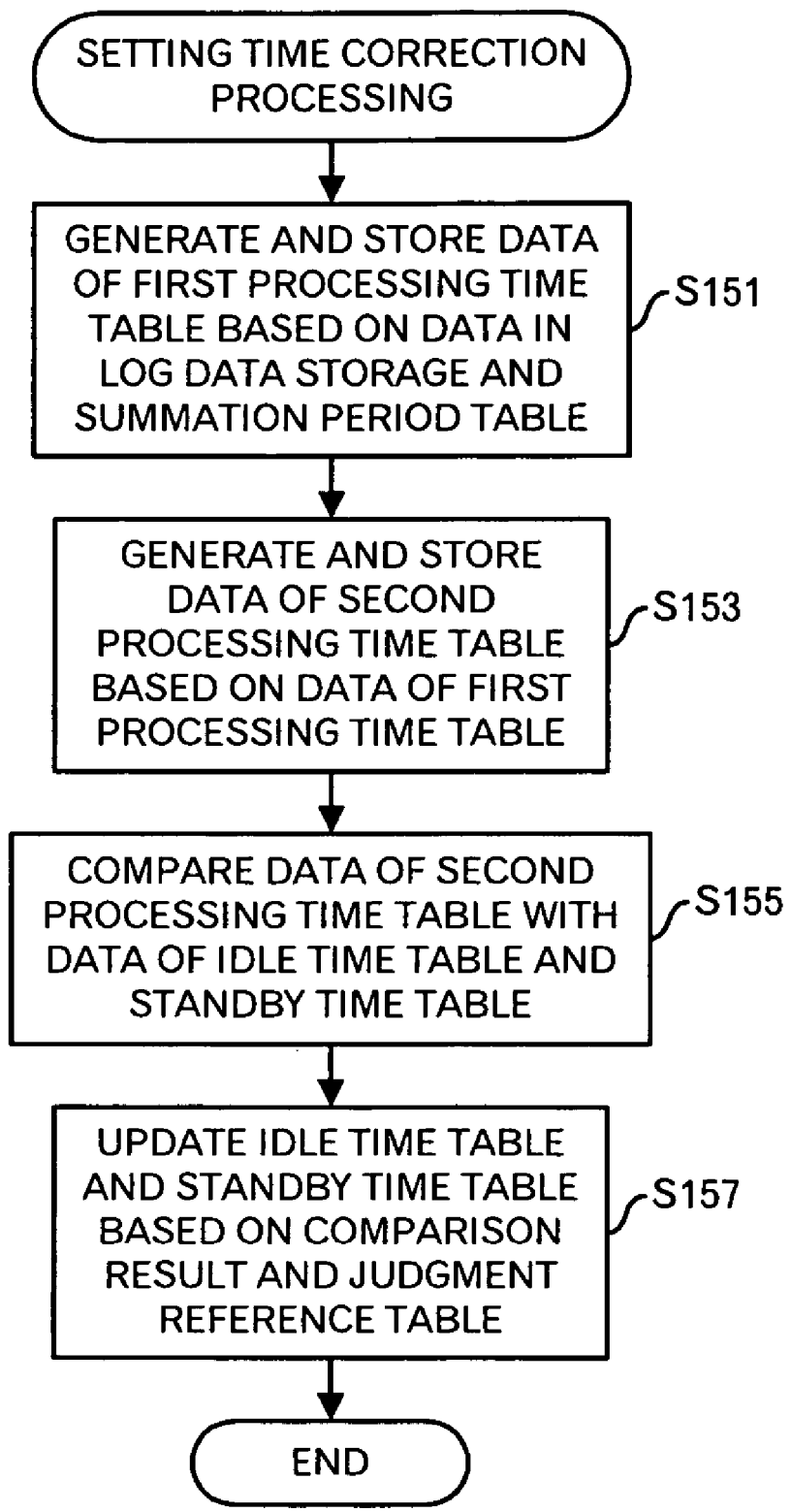
FIG. 21 is a diagram showing a processing flow of a setting time correction processing.

The details of the idle time setting processing (FIG. 17: step S33) are explained with reference to FIG. 20. Incidentally, in the embodiment, setting of the priority is specified on the basis of one of the department, item, user level and order or is specified as "standard". Besides, it is assumed that the priority is set to one of the priority month table 524, priority date table 525, and priority time table 526. First, the login manager 507 of the application server 5 confirms the data of priority set in one of the priority month table 524, priority date table 525 and priority time table 526 in the setting data storage 520 (FIG. 20: step S111). Then, the login manager 507 judges whether the priority is set for respective departments (step S113). In the case where it is judged that the priority is set for the respective departments (step S113: Yes route), the login manager 507 specifies the priority setting on the basis of the present date and time and the department to which the user belongs (step S115). As the priority setting, for example, "A" is specified. Then, the processing shifts to step S133 described later.

On the other hand, in the case where it is judged that the priority is not set for the respective departments (step S113: No route), the login manager 507 judges whether the priority is set for respective items (step S117). In the case where the priority is set for the respective items (step S117: Yes route), the login manager 507 specifies the priority setting on the basis of the present date and time and the item in charge of the user (step S119). Then, the processing shifts to the step S133 described later.

On the other hand, in the case where it is judged that the priority is not set for the respective items (step S117: No route), the login manager 507 judges whether the priority is set for respective user levels (step S121). In the case where it is judged that the priority is set for the respective user levels (step S121: Yes route), the login manager 507 specifies the priority setting on the basis of the present date and time and the managerial position level of the user (step S123). Then, the processing shits to the step S133 described later.

On the other hand, in the case where it is judged that the priority is not set for the respective user levels (step S121: No route), the login manager 507 judges whether the priority is set for respective orders (step S125). In the case where it is judged that the priority is not set for the respective orders (step S125: No route), the login manager 507 specifies the priority setting as "standard" (step S127). Then, the processing shifts to the step S133 described later.

On the other hand, in the case where it is judged that the priority is set for the respective orders (step S125: Yes route), the login manager 507 specifies the order on the basis of the ID of the screen displayed on the display device of the user terminal 3 (step S129). There is also a case where inquiry is made to the ERP server processor 501. Besides, the login manager 507 specifies the priority setting on the basis of the present date and time and the order (step S131).

Next, the login manager 507 specifies the task processing on the basis of the ID of the screen displayed on the display device of the user terminal 3 (step S133). For example, in the case where the screen ID is "A1-1", it is possible to specify that the task processing is "A1". It may be specified using an association table or the like. The login manager 507 refers to the idle time table 521 on the basis of the task processing specified at step S133 and the department to which the user belongs, extracts the pertinent idle time, and temporarily stores it in a storage device such as a work memory area (not shown) or the like (step S135). For example, "5 (minutes)" is extracted. Further, the login manager 507 refers to the standby time table 522 on the basis of the department to which the user belongs, extracts the pertinent standby time after the warning display, and temporarily stores it in the storage device such as the work memory area (not shown) or the like (step S137) For example, "4 (minutes)" is extracted.

Next, the login manager 507 extracts the priority rate from the priority rate table 523 on the basis of the specified priority setting (step S139). For example, "120%" is extracted. The login manager 507 calculates a value which is obtained by multiplying the idle time extracted at the step S135 by the priority rate extracted at the step S139, and a value which is obtained by multiplying the standby time after the warning display extracted at the step S137 by the priority rate extracted at the step S139, and temporarily stores them in the storage device such as the work memory area (not shown) or the like (step S141). For example, "6 minutes (5 minutes× 120%)" and "4.8 minutes (4 minutes×120%)" are calculated. Then, the processing returns to the original processing. In this way, the idle time setting processing is performed, and the idle time and standby time after the warning display, which correspond to this login, are determined.

Incidentally, with respect to the determination of the idle time and standby time after the warning display, reference data is stored in the idle time table 521 and standby time table 522, and the time is determined using this. However, in this embodiment, the data stored in the idle time table 521 and standby time table 522 are also suitably corrected. Such setting time correction processing is described with reference to FIG. 21. First, the setting time corrector 511 generates data of the first processing time table 535 on the basis of data of the log data storage 505 and summation period table 533, and stores it (step S151). For example, on the basis of log data for a half year, an average value of processing times for each task processing is calculated for each user and is stored in the first processing time table 535. Further, the setting time corrector 511 generates data of the second processing time table 537 on the basis of the data of the first processing time table 535 stored at the step S151 and stores it (step S153). That is, data for respective departments is generated on the basis of data for the respective users.

The setting time corrector 511 compares the data of the second processing time table 537 stored at the step S153 with the data of the idle time table 521 and standby time table 522 (step S155). The setting time corrector 511 updates the idle time table 521 and standby time table 522 on the basis of the comparison result at the step S155 and data of the judgment reference table 531 (step S157). A specific example is as shown in the description of FIG. 14.

The setting time correction processing is performed in this way. By this processing, for example, in the case where initial values set by the system administrator are not suitable, or in the case where the user becomes accustomed to the operation and comes to have an excessive margin in reference time, the reference time can be corrected.

Although the embodiment of the invention has been described, the invention is not limited to this. For example, the table structures shown in FIGS. 3 to 6, FIGS. 7A to 7D, FIGS. 8A to 8D, FIGS. 9A to 9D, and FIGS. 11 to 15 are examples, and different structures may be adopted for storing similar data, and data items may be added or deleted as the need arises. Besides, the log data shown in FIG. 10 is also an example, and elements to be recorded in the log are not limited to the elements shown in FIG. 10. Besides, the functional block configurations of the application server and user terminal shown in FIG. 1 are examples, and there is a case where they are different from actual program module structures. The functional block diagram of the computer shown in FIG. 2 is also an example, and there is also a case where it is different from an actual hardware structure. The application server may be constructed of plural servers or computers. Further, the processing flows shown in FIGS. 16 to 21 are also examples, and the sequence of the processing may be changed within the range where similar processing results can be obtained, or a step may be added or deleted as the need arises.

Although the present invention has been described with respect to a specific preferred embodiment thereof, various change and modifications may be suggested to one skilled in the art, and it is intended that the present invention encompass such changes and modifications as fall within the scope of the appended claims.

What is claimed is:

1. A computer-readable storage medium storing a login management program executed by a computer system in which a login is required by a user and a plurality of kinds of tasks are handled, said login management program causing the computer to perform a process comprising:
    adjusting and storing into an adjusted data storage, an allowable time predetermined for a combination of each task and a department to which each user belongs, by using actual usage data previously stored on a usage data storage, said allowable time including an idle time and a first standby time;
    specifying, by referring to said adjusted data storage, the adjusted allowable time corresponding to a combination of a task selected by a user and a department to which said user belongs;
    making a terminal operated by said user display said data to warn said user in a case where it is detected that data relating to the selected task is not inputted or received for a time exceeding said idle time; and
    forcibly making said user log off upon detecting that data relating to the selected task is not inputted or received for a time exceeding the specified and adjusted allowable time, wherein said adjusting comprises:
    calculating an average value of processing times for each task which is selectable by a business department to which said user belongs or by said user with respect to a predetermined period, based on said actual usage data;
    calculating an average value of second standby times from said data to warn said user is made to be displayed on said terminal operated by said user until it is detected that said data relating to the selected task is inputted or received, for each business department to which said user belongs, with respect to said predetermined period;
    adjusting said idle time according to a difference between said average value of said processing times and said idle time; and
    adjusting said first standby time according to a difference between said average value of said second standby times and said first standby time.

2. The computer-readable storage medium as set forth in claim 1, wherein said forcibly making said user log off comprises storing data concerning a screen displayed on said terminal operated by said user into a screen data storage in association with said user, and wherein said login management program further comprises causing said terminal operated by said user to display said screen in response to a re-login by said user who was forcibly made to log off by using said data concerning said screen, which is stored in said screen data storage.

3. The computer-readable storage medium as set forth in claim 2, wherein said forcibly making said user log off further comprises notifying said terminal operated by said user that data inputted by said user should be stored.

4. The computer-readable storage medium as set forth in claim 1, wherein said specifying comprises:

adjusting at least one of said idle time and said first standby time based on a priority set according to at least one of a business department to which said user belongs, an item relating to said task in charge of said user, a managerial position level of said user, an order relating to said task, and a login date and time; and specifying the adjusted allowable time based on at least one of the adjusted idle time and the adjusted first standby time.

5. A login management method executed by a computer system in which a login is required by a user and a plurality of kinds of tasks are handled, said login management method comprising:

adjusting and storing into an adjusted data storage, an allowable time predetermined for a combination of each task and a department to which each user belongs, by using actual usage data previously stored on a usage data storage, said allowable time including an idle time and a first standby time;

specifying, by referring to said adjusted data storage, the adjusted allowable time corresponding to a combination of a task selected by a user and a department to which said user belongs;

making a terminal operated by said user display said data to warn said user in a case where it is detected that data relating to the selected task is not inputted or received for a time exceeding said idle time; and forcibly making said user log off upon detecting that data relating to the selected task is not inputted or received for a time exceeding the specified and adjusted allowable time, wherein said adjusting comprises:

calculating an average value of processing times for each task which is selectable by a business department to which said user belongs or by said user with respect to a predetermined period, based on said actual usage data;

calculating an average value of second standby times from said data to warn said user is made to be displayed on said terminal operated by said user until it is detected that said data relating to the selected task is inputted or received, for each business department to which said user belongs, with respect to said predetermined period;

adjusting said idle time according to a difference between said average value of said processing times and said idle time; and adjusting said first standby time according to a difference between said average value of said second standby times and said first standby time.

6. The login management method as set forth in claim 5, wherein said forcibly making said user log off comprises storing data concerning a screen displayed on said terminal operated by said user in association with said user into a screen data storage, and said login management method further comprising causing said terminal operated by said user to display said screen in response to a re-login by said user who was forcibly made to log off by using said data concerning said screen, which is stored in said screen data storage.

7. The login management method as set forth in claim 6, wherein said forcibly making said user log off further comprises notifying said terminal operated by said user that data inputted by said user should be stored.

8. The login management method as set forth in claim 5, wherein said specifying comprises:

adjusting at least one of said idle time and said first standby time based on a priority set according to at least one of a business department to which said user belongs, an item relating to said task in charge of said user, a managerial position level of said user, an order relating to said task, and a login date and time; and specifying the adjusted allowable time based on at least one of the adjusted idle time and the adjusted first standby time.

9. A login management apparatus, wherein a login is required by a user and a plurality of kinds of tasks are handled, said login management apparatus comprising:

a memory;

an adjusting data unit that adjusts and stores into said memory, an allowable time predetermined for a combination of each task and a department to which each user belongs, by using on actual usage data having been stored on a usage data storage, said allowable time including an idle time and a first standby time;

a unit that specifies, by referring to said memory, the adjusted allowable time corresponding to a combination of a task selected by a user and a department to which said user belongs;

a unit that makes a terminal operated by said user display data to warn said user in a case where it is detected that data relating to the selected task is not inputted or received for a time exceeding said idle time; and a unit that forcibly makes said user log off upon detecting that data relating to the selected task is not inputted or received for a time exceeding the specified and adjusted allowable time, wherein said adjusting unit further:

calculates an average value of processing times for each task which is selectable by a business department to which said user belongs or by said user with respect to a predetermined period, based on said actual usage data;

calculates an average value of second standby times from said data to warn said user is made to be displayed on said terminal operated by said user until it is detected that said data relating to the selected task is inputted or received, for each business department to which said user belongs, with respect to said predetermined period;

adjusts said idle time according to a difference between said average value of said processing times and said idle time; and adjusts said first standby time according to a difference between said average value of said second standby times and said first standby time.

\* \* \* \* \*